No. 706,772. Patented Aug. 12, 1902.
R. A. McLERY, J. W. WILBUR & A. S. WOOSTER.
FOLDING STALL FOR CATTLE.
(Application filed Apr. 9, 1900.)
(No Model.)
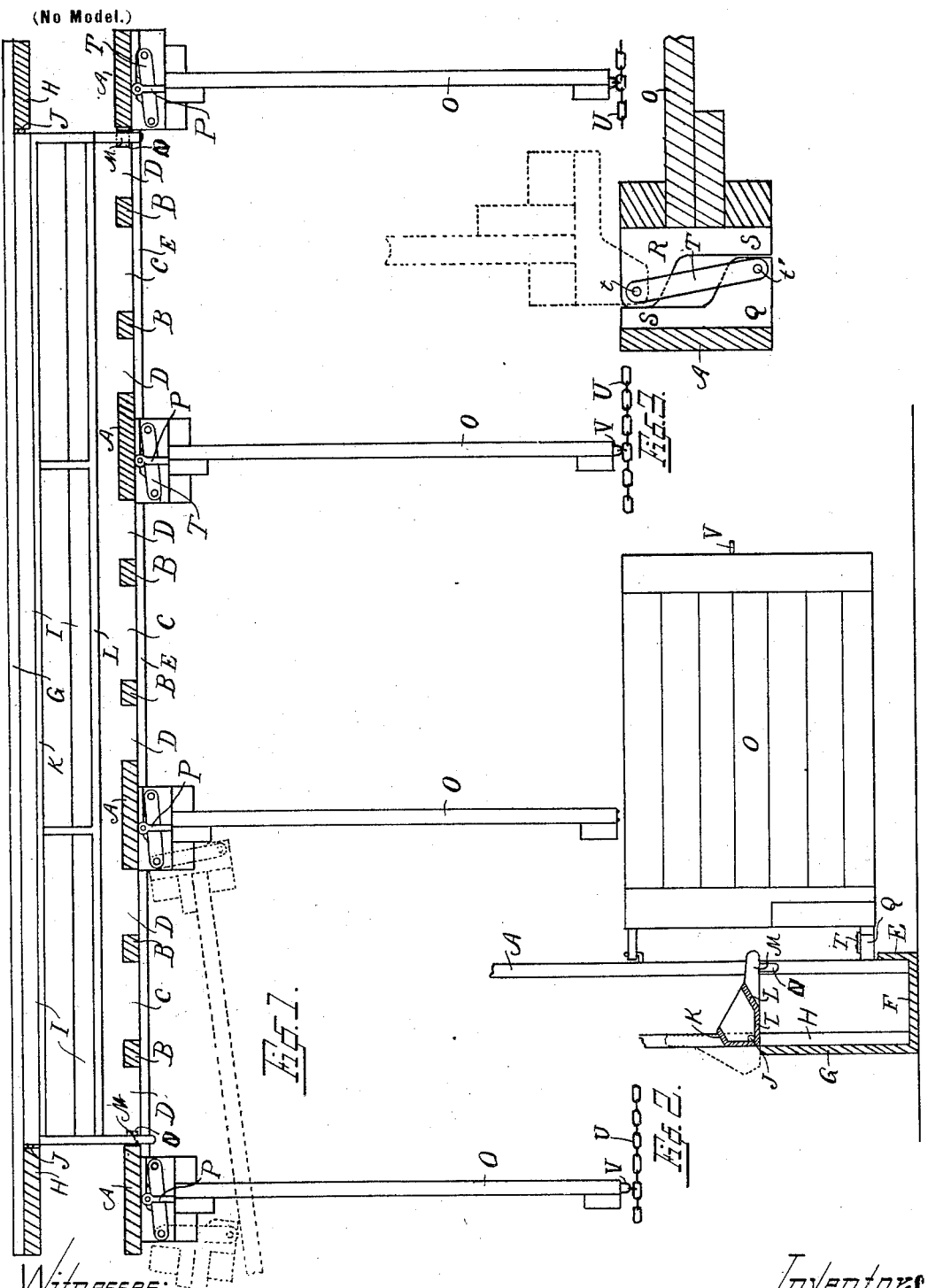

UNITED STATES PATENT OFFICE.

ROBERT A. McLERY, JOHN W. WILBUR, AND ANSON S. WOOSTER, OF PALMYRA, WISCONSIN.

FOLDING STALL FOR CATTLE.

SPECIFICATION forming part of Letters Patent No. 706,772, dated August 12, 1902.

Application filed April 9, 1900. Serial No. 12,130. (No model.)

*To all whom it may concern:*

Be it known that we, ROBERT A. MCLERY, JOHN W. WILBUR, and ANSON S. WOOSTER, citizens of the United States, and residents of Palmyra, county of Jefferson, and State of Wisconsin, have invented new and useful Improvements in Folding Stalls for Cattle, of which the following is a specification.

Our invention relates to improvements in folding stalls for cattle.

The object of our invention is to provide means for folding both the partitions which separate the cattle from each other and the meal-mangers, whereby great convenience in supporting, releasing, and feeding the cattle is secured.

A difficulty has heretofore been experienced in the provision of what is known as "box-stalls" in the fact that such stalls as usually constructed take up too much room, and if made large enough to permit persons to enter for the purpose of milking the cows the cattle will have sufficient room to turn around, which is also undesirable. With our invention, however, each stall may be adjusted at any time to increase or diminish its size, especially at the rear end, the partitions being movable in either direction, so that the walls of any stall may be readily separated.

In the following description reference is had to the accompanying drawings, in which—

Figure 1 is a plan view of a portion of a stable, showing the supporting-studs of the partitions in section. Fig. 2 is a side view of one of the partitions, showing the mangers in section, with dotted lines indicating the position of the meal-manger when folded. Fig. 3 is a detail sectional view of a portion of one of the partitions and its support, drawn horizontally at a point slightly above the lower hinge.

Like parts are identified by the same reference-letters throughout the several views.

A A are the supporting-posts of the stall-partitions.

B B are stationary or fixed stanchions, the space C between the stanchions being of sufficient width to permit the passage of the head of the animal, while the spaces D D between the stanchions B and posts A are of less width. The stanchions B are therefore effective to prevent each animal from trespassing upon the manger-space of the other. It will also be understood that the space C is sufficiently narrow to prevent the shoulders and fore feet of the animal from entering the manger.

The main or fixed manger is constructed with a front wall or rail E, bottom F, and rear wall G, the latter being secured to standards H. The meal-manger I is formed in sections, each pivotally supported from the standards H by trunnions J. The meal-manger is partially covered by a wall K, and the front wall L is inclined forwardly, so as to permit of easy access to the contents of the manger. The brackets M are secured to the ends of the manger-sections and are adapted to rest upon blocks N, secured to the posts A. The construction is such that the meal-manger may be easily folded to a vertical position, as shown by dotted lines in Fig. 2, in which position it may be filled with the food-supply, the latter being retained in the manger by the wall K. When so filled, the manger may be tilted to a horizontal position, with the brackets M resting on the blocks N, thus giving the cattle access to the food. When the manger is tilted to the upright position, it forms an additional back for the fixed or stationary manger and permits easy access to the latter.

Referring to the folding partitions, it will be observed that each partition O is hung from a post A by hinges, which permit it to swing freely in either direction. The upper hinge P is of ordinary type. The lower hinge is formed of the block Q, secured to the post A, and a block R, secured to the partition O. Each block R is provided with an extension S, adapted to lap over one edge of the opposing block, as best shown in Fig. 3. The two blocks are connected by means of a metallic strap T, pivotally secured at $t$ $t'$ to the respective blocks. With this construction it is obvious that the partitions may be swung in either direction and that when so swung the lower end will be moved outwardly and laterally by reason of the fact that the block R must swing upon one of the pivots $t$ $t'$ as a center. When the partition is swung in one direction, the block R will swing upon the pivot $t$ as a center, and when the partition is swung in the other direction the block R and strap T will swing upon the pivot $t'$ as a center. If the partition is swung to a right-angled position in either direction from the normal, it will tend to remain in such position, but if swung to any intervening point it will automatically swing back to its normal position, separating the stalls.

It will be observed that the partitions O are of such length that they will overlap when folded, as indicated by dotted lines in Fig. 1. It is therefore evident that by swinging the left-hand partition to its normal position it will automatically start all the others and cause them to also move to their normal positions at a right angle to the line of the manger.

When the cattle are in their places, they may be secured therein by means of chains U, connected with staples V in the ends of the partitions by ordinary hooks. When it is desired to enter a stall, the chains in the rear of that stall may be released, when the partitions may be separated at their rear ends as far as necessary to permit entry into the stall. It is therefore evident that the respective stalls may be made barely sufficient in width for the cattle to stand therein, thus preventing the cattle from turning around when in the stall.

A space is left between the lower edge of the partition and the floor, as shown in Fig. 2, to permit the cattle to extend their feet laterally when lying down, and as the partitions are free to move in either direction, there being no supporting-posts or fixed standards at the outer ends of the partitions, it is obvious that the stalls will accommodate themselves to the movement of the cattle, allowing them almost the same freedom, except for turning, which they would enjoy in a much larger stall.

Having thus described our invention, what we claim as new, and desire to secure by Letters Patent, is—

In a stable, the combination of a series of swinging partitions hinged to suitable supports at their inner ends along the manger-line, with their outer ends unsupported and free to move in either direction, each independently of the others; a pivotal hinge for each of said partitions; a second hinge for each partition, acting eccentrically to tilt the partition, when swung from its normal position at right angles to the manger-line, whereby the partition will be automatically restored to normal position by gravity, except when swung to an extreme or folded position with both hinge-joints in substantially the plane of the partition, said partitions being formed to overlap when folded, whereby the movement of one will adjust the others to a position for automatic operation.

In testimony whereof we affix our signatures in the presence of two witnesses.

ROBERT A. McLERY.
JOHN W. WILBUR.
ANSON S. WOOSTER.

Witnesses:
C. L. CALKINS,
CHAS. E. WILLIAMS.